(12) United States Patent
Fair et al.

(10) Patent No.: US 7,676,633 B1
(45) Date of Patent: Mar. 9, 2010

(54) EFFICIENT NON-BLOCKING STORAGE OF DATA IN A STORAGE SERVER VICTIM CACHE

(75) Inventors: Robert L. Fair, Cary, NC (US); Naveen Bali, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 604 days.

(21) Appl. No.: 11/701,011

(22) Filed: Jan. 31, 2007

(51) Int. Cl.
*G06F 12/02* (2006.01)
*G06F 12/12* (2006.01)

(52) U.S. Cl. .................. 711/133; 711/122
(58) Field of Classification Search .......... 711/122, 711/133
See application file for complete search history.

(56) References Cited

U.S. PATENT DOCUMENTS

2007/0094450 A1* 4/2007 VanderWiel ............... 711/133

* cited by examiner

*Primary Examiner*—Reginald G Bragdon
*Assistant Examiner*—Kenneth M Lo
(74) *Attorney, Agent, or Firm*—Blakely, Sokoloff, Taylor & Zafman LLP (57) ABSTRACT

A network storage server has a non-volatile mass storage facility, a main cache and a victim cache. A technique of efficient, non-blocking storage of data in the victim cache includes, responding to a caller process by, without blocking the caller process, selecting a first storage unit for eviction from the main cache, destaging the first storage unit for storage in the victim cache without copying the first storage unit, and identifying a second storage unit to the caller process as available to be overwritten in the main cache.

22 Claims, 7 Drawing Sheets

EFFICIENT NON-BLOCKING STORAGE OF DATA IN A STORAGE SERVER VICTIM CACHE

FIELD OF THE INVENTION

At least one embodiment of the present invention pertains to network storage systems, and more particularly, to efficient non-blocking storage of data in a storage server victim cache.

BACKGROUND

Various forms of network storage systems exist today, including network attached storage (NAS), storage area networks (SANs), and others. Network storage systems are commonly used for a variety of purposes, such as backing up critical data, data mirroring, providing multiple users with access to shared data, etc.

A network storage system includes at least one storage server, which is a processing system configured to store and retrieve data on behalf of one or more client processing systems ("clients") that are used by users of the network storage system. In the context of NAS, a storage server is commonly a file server, which is sometimes called a "filer". A filer operates on behalf of one or more clients to store and manage shared files. The files are stored in a non-volatile mass storage subsystem (which is typically external to the storage server, but does not have to be) which may include one or more arrays of non-volatile mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with access to stored data at a sub-file level of granularity, such as block-level access, rather than file-level access. Some storage servers are capable of providing clients with both file-level access and block-level access, such as certain Filers made by Network Appliance, Inc. (NetApp®) of Sunnyvale, Calif.

Caching is a technique that is commonly used to reduce latency associated with accessing data in computer-related applications, including in network storage systems. For example, the main memory (i.e., random access memory (RAM)) of a storage server is often used as a cache logically between the storage server's main central processing unit (CPU) and the non-volatile mass storage (e.g., disk) subsystem, since the RAM which forms the main memory generally has a much smaller access latency than the disk subsystem. Accordingly, the main memory of a storage server is sometimes called the "buffer cache" or, simply, the "cache". Note that this kind of cache should not be confused with other forms of cache memory, known as level 1 ("L1") cache, level-2 ("L2") cache, etc., which are commonly used by a microprocessor (and typically implemented on the same chip or the same motherboard as the microprocessor) to reduce the number of accesses to main memory. In the context of this document, the buffer cache (or simply "cache") of a storage server is the main memory itself.

Some network storage servers also employ an additional level of caching logically between the buffer cache (main memory) and the non-volatile mass storage subsystem. This additional cache is known as a "victim cache". In the context of this document, a "victim cache" is a cache that holds some of the data blocks ("victims") most recently evicted from a main or primary cache, which in this context is main memory of the storage server. The main memory in a storage server is in certain instances called the "main cache" in this document, to distinguish it from the victim cache.

A victim cache in a storage server is generally a medium-size auxiliary storage facility that is faster than normal RAID disk storage, but slower than main memory. Such a victim cache might be implemented on, for example, an external memory card, using solid state disks (SSDs) or other types of storage devices. The size of such a cache can range from, for example, a few GBytes up to hundreds of GBytes or more. When a data block, or "buffer", is needed but not found in main memory, the victim cache is consulted prior to loading the buffer from RAID disks. Note that the terms "buffer" and "data block" (or simply "block") are used herein interchangeably. A data block, or "buffer", is the basic unit of data transfer of the file system in a storage server. Buffers are commonly 4 Kbytes in size, though different storage systems may use buffers of different sizes.

The process of finding an old buffer in the main cache and then evicting it is known as "buffer scavenging". This process is often expected to return another buffer for the storage server to immediately overwrite (reuse) in the main cache. For optimal system performance, the buffer scavenging process should not be blocking; that is, the process which invokes (calls) the scavenging process should not be prevented from doing something else while the scavenging process executes (i.e., until a reusable buffer is returned). However, when a victim cache is used, there is generally latency associated with performing a write to the victim cache and then waiting for the response. Thus, there is a tension between the desire for fast, efficient scavenging and the need to preserve the evicted buffer and its contents until it has been successfully stored in the victim cache.

SUMMARY OF THE INVENTION

The present invention includes a method of operating a network storage server. The method includes performing data access operations on a non-volatile mass storage facility, a main cache and a victim cache of the network storage server. In certain embodiments, the method further includes invoking a memory management process to select a first storage unit for eviction from the main cache, wherein the memory management process further is to overwrite a storage unit in the main cache in conjunction with selection of the first storage unit for eviction from the main cache. The method further includes, without blocking said memory management process, destaging the first storage unit for storage in the victim cache without copying the first storage unit, and identifying a second storage unit to the memory management process as available to be overwritten in the main cache.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for efficient, non-blocking storage of data in a storage server victim cache are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

As noted above, there is a tension between the desire for fast, efficient scavenging and the need to preserve the evicted buffer and its contents until it has been successfully stored the victim cache. One possible method to solve this is to copy the buffer data from main cache into temporary storage, then asynchronously destage the temporary storage to the victim cache. However, this approach is inefficient in terms of CPU usage, due to the need to copy many bytes of main cache memory on each scavenge (a common buffer size is 4 Kbytes). Another approach is to perform proactive scanning of old buffers likely to be ejected from the main cache. However, this approach adds complexity and may eject buffers inappropriately.

The solution introduced here addresses these issues with a method that allows asynchronous buffer scavenging of main memory, with non-blocking, non-copy destaging to the victim cache. By "asynchronous buffer scavenging", what is meant is that the process of actually storing a buffer in the victim cache is asynchronous with the process of evicting buffers from the main cache. The solution introduced here also provides multi-block coalescing for more efficient writes to the victim cache.

Every buffer (data block) stored by a storage server includes both metadata and user data. The metadata of a buffer is also called the buffer's header and, among other purposes, it identifies the buffer. According to the technique being introduced here, and as described in greater detail below, a storage server maintains a first queue, called the New queue, to store data identifying buffers that are to be stored in the victim cache, and a second queue, called the Done queue, to store data identifying buffers that have actually been stored in the victim cache. Buffers whose identifying data ("headers") are stored in the New queue are considered to be "destaged" for storage in the victim cache, although they have not yet actually been stored in the victim cache.

When a buffer is selected for eviction from the main cache by the scavenging process, a victim cache process stores the header data of that buffer in the New queue. (Note that essentially any conventional algorithm can be used to identify/select buffers for eviction from the main cache (e.g., least recently used (LRU)); which particular algorithm is used for that purpose is not germane to the technique introduced here.) In addition, the victim cache process identifies another buffer from the head of the Done queue, and that buffer is indicated to the scavenging process as available for reuse in the main cache. If the Done queue is empty when this occurs, then whichever buffer was being evicted from the main cache to trigger this process is returned to the scavenging process as available for reuse in the main cache.

When the New queue becomes full, the victim cache process copies the buffers identified in it from the main cache to the victim cache, and the header data of those buffers are also stored in the Done queue. Note, however, that the complete buffers are not copied until they are actually stored in the victim cache, i.e., no copying of the user data occurs when destaging buffers to the New queue.

This solution allows a storage server victim cache to have excellent performance even when the victim cache has appreciable latency. Additionally the technique has low CPU overhead, since no copying of buffers is required for purposes of destaging them to the victim cache. Further, the transparent queuing of buffers in the victim cache increases I/O efficiency.

Figure 1:
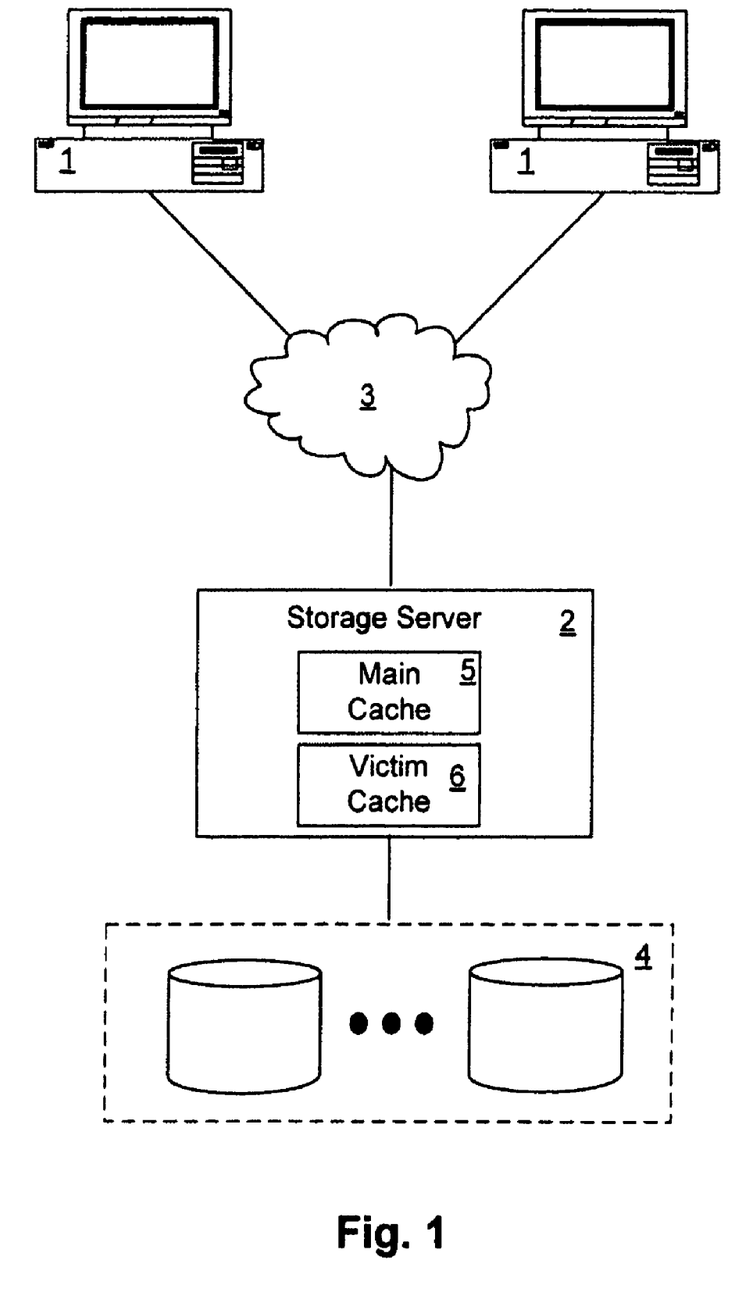
FIG. 1 illustrates a storage network environment which includes a storage server.

FIG. 1 shows a simple example of a network environment which incorporates a storage server 2, in which the technique introduced here can be implemented. As shown, the storage server 2 includes a main cache 5 and a victim cache 6. The storage server 2 is coupled to a mass storage subsystem 4, which includes a set of non-volatile mass storage devices and which is the largest data storage facility managed by the storage server 2. The storage server 2 is also coupled to a set of storage clients 1 (hereinafter simply "clients") through a network 3. The network 3 may be, for example, a local area network (LAN), a wide area network (WAN), a global area network (GAN) such as the Internet, a Fibre Channel fabric, or a combination of such networks. Each of the clients 1 may be, for example, a conventional personal computer (PC), server-class computer, workstation, or the like.

The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in storage subsystem 4 may be organized by the storage server 2 in the form of one or more RAID groups.

Although illustrated as a self-contained element, the storage server 2 may have a distributed architecture; for example, it may include a separate N- ("network") module and D- (disk) module (not shown). In such an embodiment, the N-module is used to communicate with clients 1, while the D-module includes the file system functionality and is used to communicate with the storage subsystem 4. The N-module and D-module communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the storage servers has access.

Figure 2:
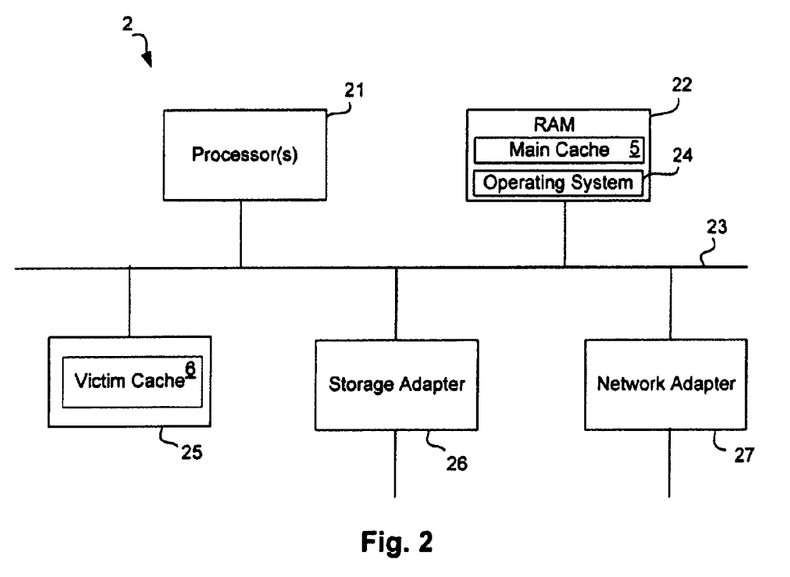
FIG. 2 shows an example of the hardware architecture of the storage server, including a victim cache.

FIG. 2 is a block diagram showing an example of the architecture of the storage server 2 at a high level. Certain standard and well-known components which are not germane to the present invention are not shown. The storage server 2 includes one or more processors 21 and RAM 22 coupled to a bus system 23. The storage server 2 may also include one or more forms of read-only memory (ROM), not shown. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a form of Peripheral Component Interconnect (PCI) bus, HyperTransport or industry standard architecture (ISA) bus, small computer system interface (SCSI) bus, universal serial bus (USB), Inter-IC (I2C) bus, or Institute of Electrical and Electronics Engineers (IEEE) standard 1394 bus (sometimes referred to as "Firewire").

The processors 21 form the CPU of the storage server 2 and, thus, control its overall operation. In certain embodiments, the processors 21 accomplish this by executing software stored in RAM 22 and/or other memory in the storage server 2. Each processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

RAM 22 is the main memory (main cache) of the storage server 2 and also may store some or all of the storage server's operating system 24 during normal operation. Operations associated with the technique being introduced here can be implemented by the operation system 24.

Also connected to the processors 21 through the bus system 23 are a peripheral device 25 which implements the victim cache 6, a storage adapter 26 and a network adapter 27. Peripheral device 25 can be implemented as a dedicated expansion card, and the memory which embodies the victim cache 6 may be implemented in the form of SSDs or other types of storage devices. Note, however, that it is not essential that the victim cache 6 be internal to the storage server 2.

The storage adapter 26 allows the storage server 2 to access the mass storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter, a Fibre Channel adapter, or the like.

Figure 3:
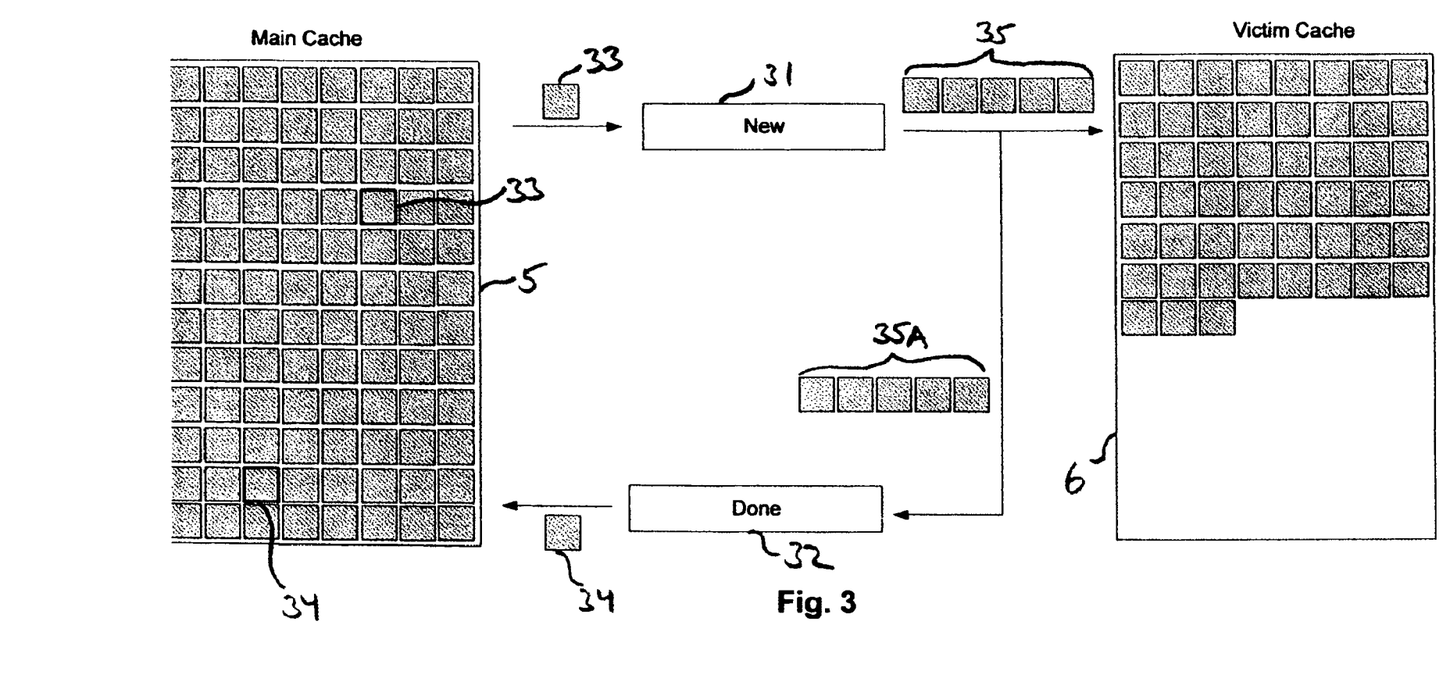
FIG. 3 illustrates the technique of buffer scavenging and using a victim cache in conjunction with a New queue and a Done queue.

Referring now to FIG. 3, the technique being introduced here will be described in greater detail. The storage server 2 maintains a New queue 31 to store buffer headers identifying buffers that are to be stored in the victim cache, and a Done queue 32 to store buffer headers identifying buffers that have actually been stored in the victim cache 6. Buffers whose headers are stored in the New queue 31 are considered to be "destaged" for storage in the victim cache 6, although they have not yet actually been stored in the victim cache 6.

When any particular buffer 33 is selected for eviction from the main cache 5 by the scavenging process, the header data 33A of that buffer 33 are stored in the New queue 31. In addition, another buffer 34 is identified from the header data 34A at the head of the Done queue 32, and that buffer 34 is indicated to the calling process (e.g., the storage manager) as available for reuse in the main cache 5. If the Done queue 32 is empty when this occurs, then the buffer 33 that was being evicted from the main cache to trigger this process is instead returned to the calling process as available for reuse in the main cache 5.

Note that any conventional algorithm(s) can be used to decide which buffers should be evicted from the main cache 5 (e.g., least recently used (LRU), first-in/first-out (FIFO), etc.). Which particular algorithm(s) are used for this purpose and the details of such algorithm(s) are not germane to the technique being introduced here and is therefore not discussed further herein.

In general, it is inefficient to perform a separate write to the victim cache 6 for each buffer being evicted from the main cache 5. Therefore, buffers evicted from the main cache 5 are not immediately written to the victim cache 6. Rather, they are destaged for subsequent storage in the victim cache 6, by placing their header data in the New queue 31. When a threshold number of buffer headers have been stored in the New queue 31 (or stated another way, when the New queue 31, which has a predetermined size, becomes full), the user data 35 of those buffers represented in the New queue 31 are written into the victim cache 6 in a single write operation. This form of multi-buffer coalescing allows for efficient writes to the victim cache 6 (as opposed to, for example, writing each buffer individually to the victim cache 6).

Once a buffer's user data is stored in the victim cache 6, the buffer can safely be overwritten in the main cache 5. Therefore, when user data 35 are written to the victim cache 6, the header data 35A of those buffers are also loaded into the Done queue 32.

Note that the existence and use of the New queue and the Done queue can be completely transparent to the caller process (e.g., the scavenging process), as can be the fact that the evicted buffers are not immediately written to the victim cache.

Figure 4:
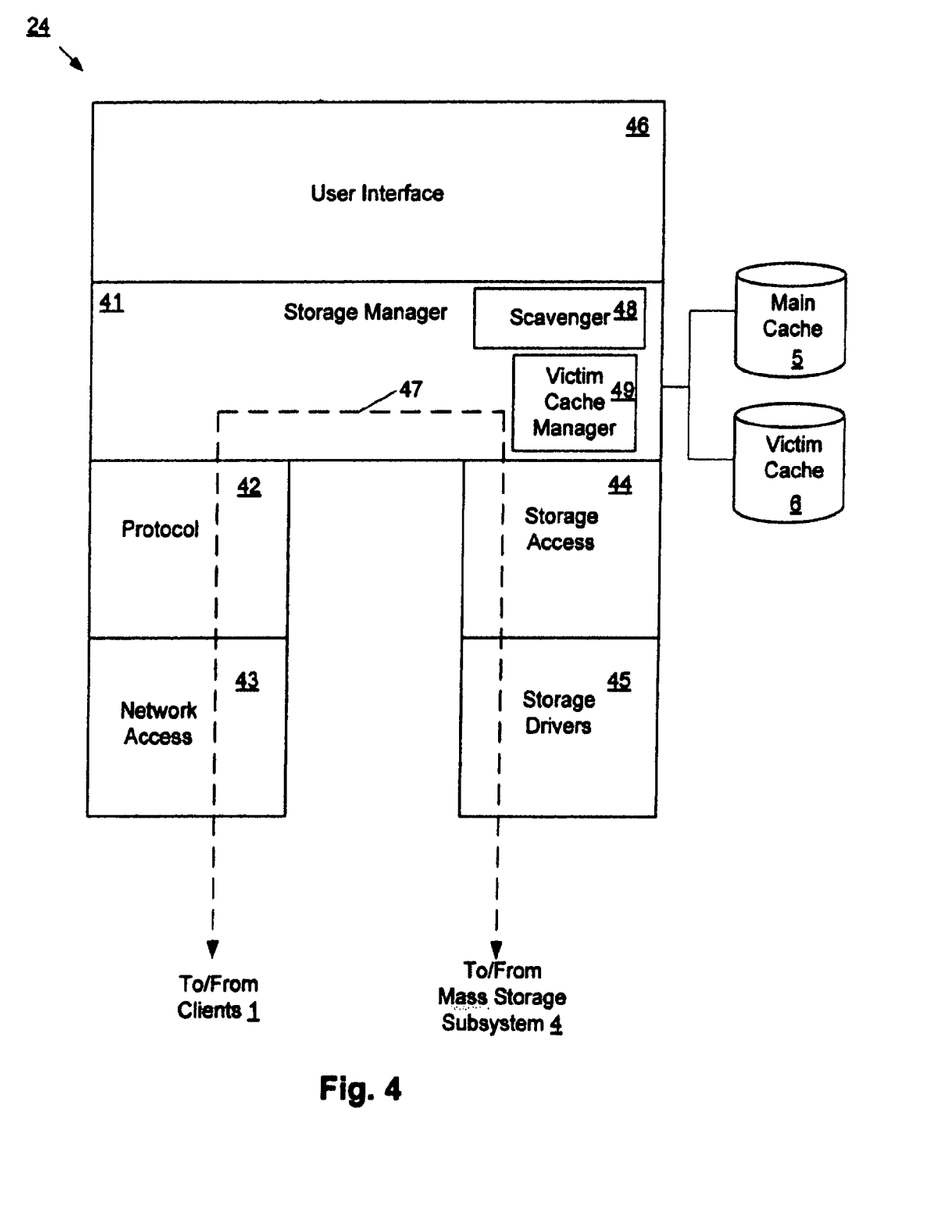
FIG. 4 illustrates the architecture of the operating system of the storage server.

The storage server 2 includes an operating system to control its operation, including implementation of the technique illustrated in FIG. 3. An example of the operating system is shown in FIG. 4. The operating system 24 and its constituent elements are preferably implemented in the form of software and/or firmware. However, in some embodiments, some or all of the elements of the operating system may be implemented in the form of special-purpose hardware such as one or more application specific integrated circuits (ASICs), programmable logic devices (PLDs) or the like, or a combination of such hardware and software/firmware.

As shown, the operating system 24 includes several modules, or "layers". These layers include a storage manager 41. The storage manager 41 is, in certain embodiments, software that manages one or more file systems or other structured sets of data managed by the storage server 2. In particular, the storage manager 41 imposes a hierarchy (e.g., a directory/file structure) on the data stored in the storage subsystem 4 and manages client-initiated read and write operations at a high level (while delegating certain functions to lower-level layers). The storage manager 41 also manages access to the main cache 5, the victim cache 6 and (at a high level) the mass storage subsystem 4 (access to the mass storage subsystem 4 is managed at a lower-level by the storage access layer 44, as discussed below).

To allow the storage server 2 to communicate over the network 3 (e.g., with clients 1), the operating system 24 also includes a network access layer 43, and a protocol layer 42 operatively coupled between the storage manager 41 and the network access layer 43. The protocol layer 42 implements a number of higher-level network protocols, such as Network File System (NFS), Common Internet File System (CIFS) and/or Hypertext Transfer Protocol (HTTP) running over Transmission Control Protocol/Internet Protocol (TCP/IP); and/or Internet SCSI (iSCSI) and/or Fibre Channel Protocol (FCP). The network access layer 43 includes one or more drivers which implement one or more lower-level protocols to communicate over the network, such as Ethernet or Fibre Channel.

To enable the storage server 2 to communicate with the mass storage subsystem 4, the operating system 24 includes a storage driver layer 45, and a storage access layer 44 operatively coupled between the storage manager 41 and the storage driver layer 45. The storage access layer 44 implements a higher-level disk storage protocol, such as RAID-4, RAID-5 or RAID-DP, while the storage driver layer 45 implements a lower-level storage device access protocol, such as Fibre Channel Protocol (FCP) or SCSI. The storage access layer 4 is alternatively called the "RAID layer" in this description.

Also shown in FIG. 4 is the path 47 of data flow, through the operating system 24, associated with a client-initiated read or write request.

The operating system 24 also includes a user interface 46 to generate a command line interface (CLI) and/or graphical user interface (GUI), to allow administrative control and configuration of the storage server 2, from a local or remote terminal.

As shown in FIG. 4, the storage manager 41 includes a scavenger module 48 and a victim cache manager 49. The scavenger module 48 implements the buffer scavenging process, as described above and as further described below. The victim cache manager 49 controls the storage of data in the victim cache, the New queue and the Done queue, as described above and as further described below. To facilitate these operations, the victim cache manager 49 also maintains a fast lookup table (not shown) that indicates whether any given buffer is in the victim cache 6, and if so, where it is in the victim cache 6. This lookup table can reside in main memory and can be implemented as a hash or tag table.

Figure 5:
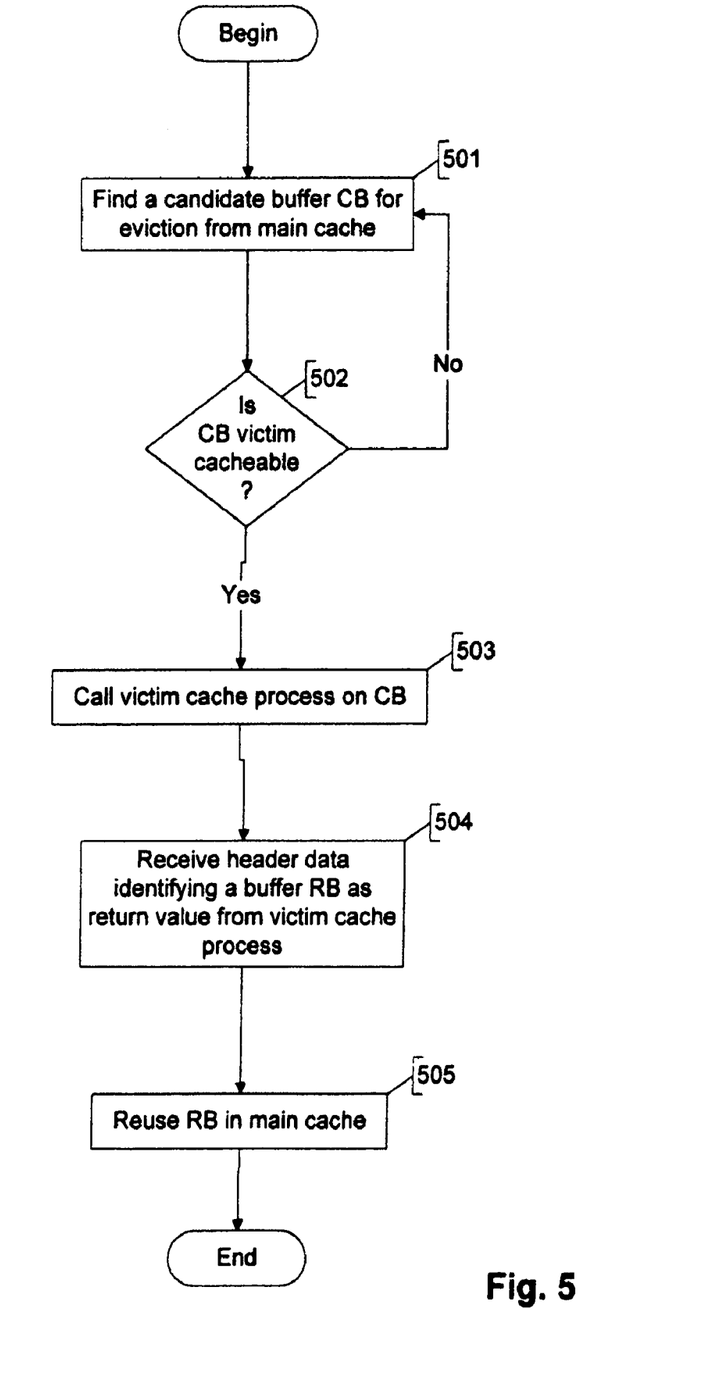
FIG. 5 is a flow diagram illustrating an example of the buffer scavenging process.

FIG. 5 illustrates an example of the scavenging process performed by the scavenger module 48 in accordance with the technique being introduced here. Initially, in operation 501 the scavenging process finds a candidate buffer CB to evict from the main cache 5 (which, as noted above, may be any suitable algorithm and which is not germane to the technique introduced here). This action is typically driven by a need to free up space in the main cache 5 to write a new buffer. Next, in operation 502 the scavenging process determines whether that buffer CB can be cached in the victim cache 6. The criterion or criteria used to determine this are not germane to the technique introduced here. If the buffer CB is not victim cacheable, then the buffer CB is taken as the return buffer RB, and the process continues to operation 505. In operation 505, the scavenging process reuses (overwrites) the return buffer RB in the main cache 5 to end the process.

If, however, the buffer is determined to be victim cacheable in operation 502, then the process proceeds to operation 503, in which the scavenger process calls the victim cache process (implemented by the victim cache manager 49, as described further below) on that buffer CB. Subsequently in operation 504, and asynchronously with the aforementioned call, the scavenging process receives header data identifying a return buffer RB, as the return value from the victim cache process. This return value is an indication from the victim cache process that the identified buffer RB can be reused (overwritten) in the main cache. Accordingly, in operation 505 the scavenging process reuses (overwrites) the return buffer RB in the main cache 5 to end the process, as noted above. Of course, this process may iterate multiple times with multiple buffers if space for multiple buffers is needed in the main cache.

Figure 6:
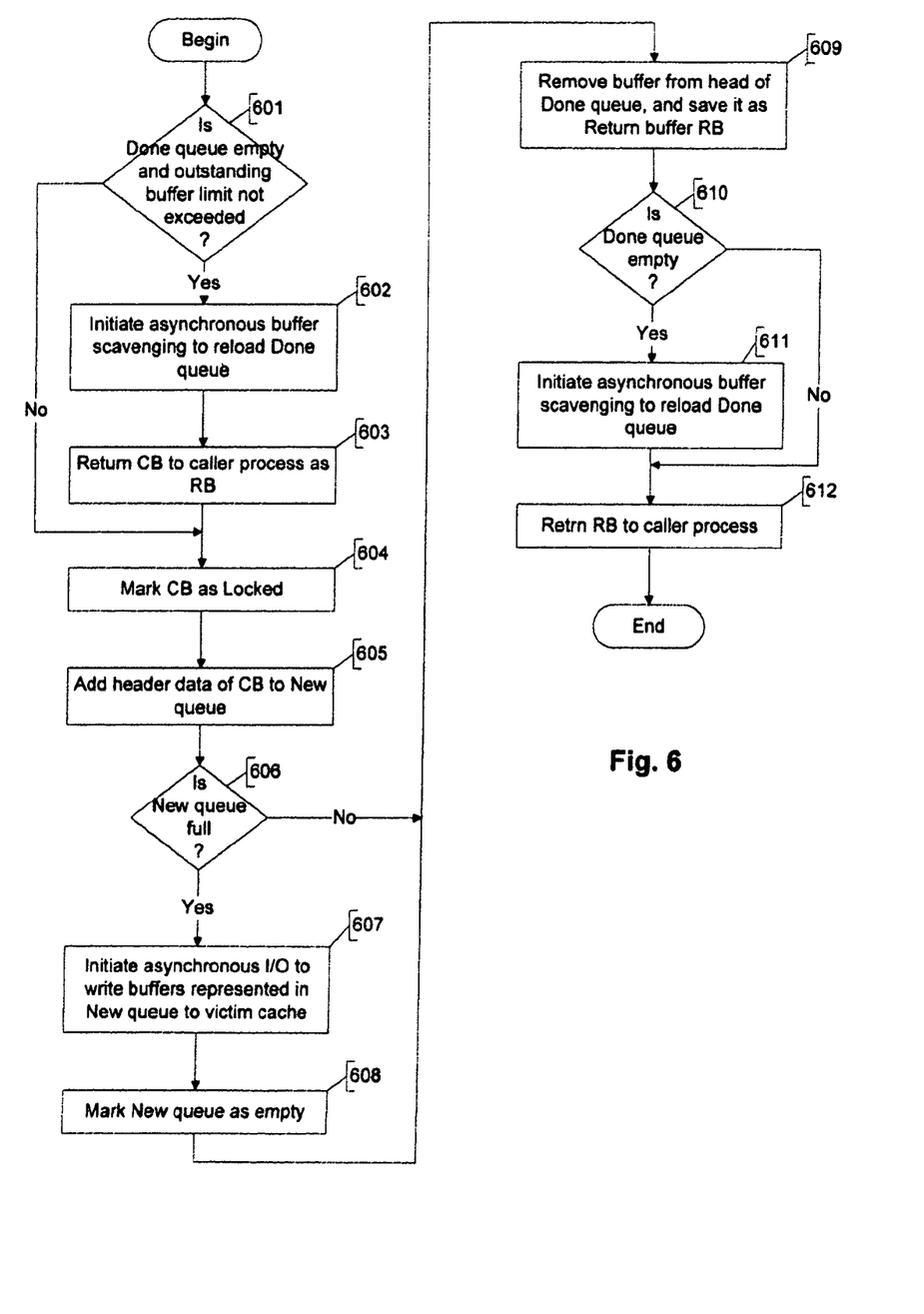
FIG. 6 is a flow diagram illustrating an example of the victim cache process.

FIG. 6 illustrates an example of a victim cache process performed by the victim cache manager 49 in accordance with the technique being introduced here. This process is normally executed in response to a call from the scavenging process and receives data identifying the candidate buffer CB as input. Initially, in operation 601 the process determines whether the Done queue 32 is empty and whether the outstanding buffer limit (limit on the number of buffers that may be in-flight to the victim cache) has been exceeded. If the Done queue 32 is not empty or the outstanding buffer limit has been exceeded, the process proceeds to operation 604, described below.

If the Done queue 32 is empty and the outstanding buffer limit has not been exceeded, then in operation 602 the process initiates asynchronous buffer scavenging of the main cache 5 by the scavenging process to cause the Done queue 32 to be reloaded (see description of FIG. 7, below), and in operation 603 the process returns header data identifying the candidate buffer CB to the caller process (e.g., the scavenging process) as the return buffer RB value. In alternative embodiments, operation 601 may determine whether the Done queue 32 has fallen below a predetermined degree of fullness, rather than determining whether it is completely empty. In other words, it is not necessary to wait until the Done queue is completely empty before reloading it.

Next, in operation 604 the process marks the candidate buffer CB as Locked. The process then adds the header data of that buffer CB to the New queue 31 in operation 605. Next, the process determines whether the New queue 31 is full in operation 606. If the New queue 31 is not full, and the process jumps to operation 609, described below. If the New queue 31 is full, then in operation 607 the process initiates asynchronous I/O to write all buffers that are represented in the New queue 31 (the user data of which still reside in the main cache) in their entireties into the victim cache 6. The New queue 31 is then marked as empty in operation 608.

Next, in operation 609 the process removes the header data of a buffer from the head of the Done queue 32 and saves it as the return buffer RB value. If the Done queue 32 is determined not to be empty in operation 610, the process then proceeds to operation 612, in which the return buffer RB value is returned to the caller process, to end the victim cache process. If, however, the Done queue 32 is determined to be empty, the process initiates asynchronous buffer scavenging to reload the Done queue 32 in operation 611, and then performs operation 612 as just described, to end the victim cache process.

Figure 7:
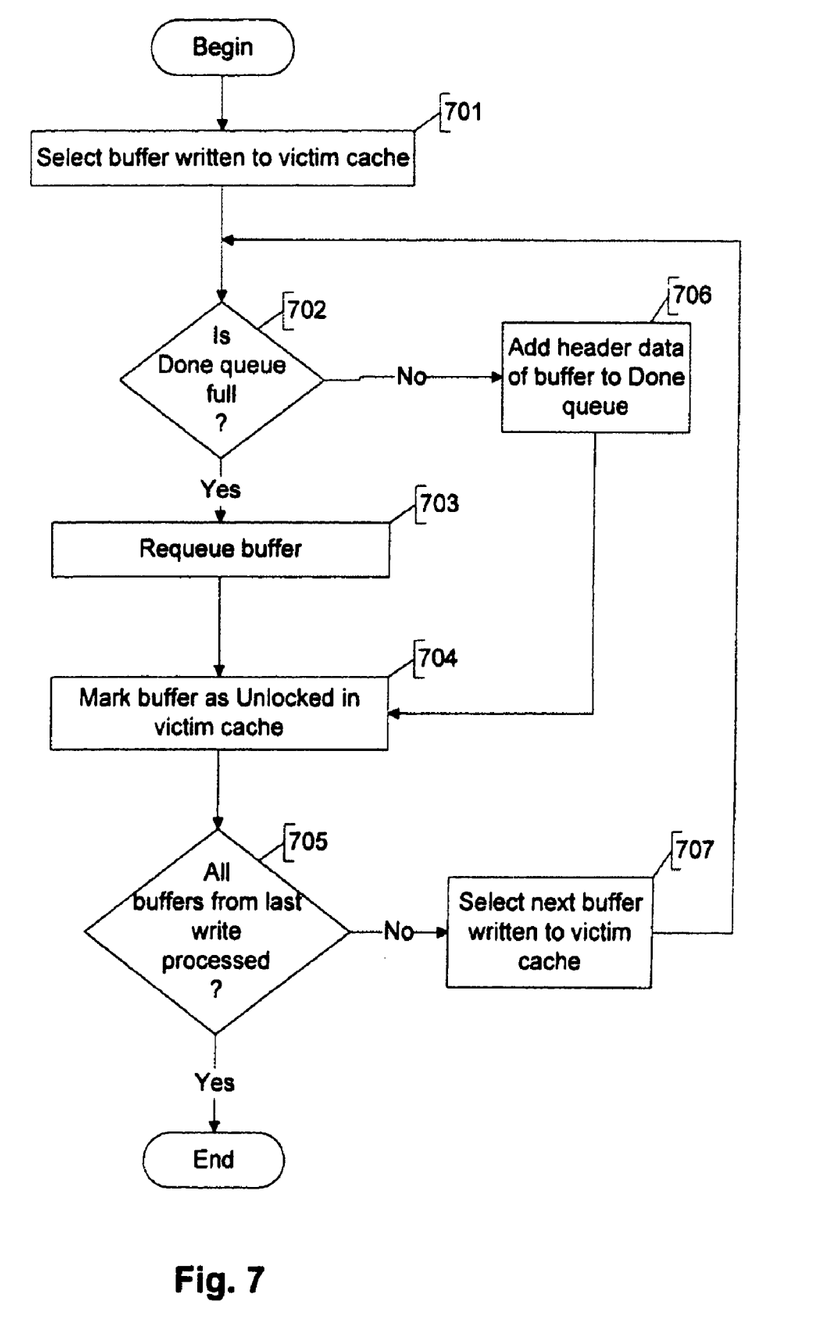
FIG. 7 is a flow diagram illustrating an example of the process for reloading the Done queue.

As described above, operation 607 involves writing the buffers represented in the New queue 31 into the victim cache 6. In conjunction with that operation, the header data of those same buffers are loaded into the Done queue 32. The process of loading the Done queue 32 is described now with reference to FIG. 7. The process in FIG. 7 is executed for each buffer that is written into the victim cache 6.

Initially, in operation 701 the process selects a buffer that has been written to the victim cache 6. If the Done queue 32 is determined not to be full in operation 702, then the header data of the selected buffer is loaded into the Done queue 32 in operation 706, and the process then proceeds to operation 704, described below.

If, however, the Done queue 32 is determined to be full in operation 702, then in operation 703 the buffer is requeued (i.e., handed back to the available pool of buffers in the main cache 5). Next, in operation 704 the buffer is marked as Unlocked in the victim cache 6. If all of the buffers from the last write to the victim cache 6 have been processed in this way (operation 705), the process ends. Otherwise, the next buffer that has been written to the victim cache 6 is selected in operation 707 for processing, and the process then loops back to operation 702 as described above, for processing of that buffer.

Note that various modifications or variations upon the above described technique are possible. For example, a storage server can have multiple victim caches, and I/O operations to the multiple victim caches can be performed in parallel. In this way, multiple victim caches can be effectively operated as a single larger victim cache.

It can be seen that the solution introduced above allows a storage server victim cache to have excellent performance even if the victim cache has appreciable latency. Additionally the technique has low CPU overhead, since no copying of buffers is required when destaging buffers to the victim cache. Further, the transparent queuing of buffers in the victim cache increases I/O efficiency.

Thus, a method and apparatus for efficient, non-blocking storage of data in a storage server victim cache have been described.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a network storage server, the method comprising:
   performing data access operations on a non-volatile mass storage facility, a main cache and a victim cache of the network storage server;
   invoking a memory management process to select a first storage unit for eviction from the main cache, wherein the memory management process further is to overwrite a storage unit in the main cache in conjunction with selection of the first storage unit for eviction from the main cache;
   without blocking said memory management process,
   destaging the first storage unit for storage in the victim cache without copying the first storage unit, and
   identifying a second storage unit to the memory management process as available to be overwritten in the main cache;
   maintaining a first queue to store metadata of storage units that are to be stored in the victim cache,
   wherein said destaging comprises storing the metadata of the first storage unit in the first queue;
   maintaining a second queue to store metadata of storage units that are stored in the victim cache; and
   in conjunction with said storing the corresponding user data of said storage units from the main cache to the victim cache, storing the metadata of said storage units in the second queue,
   wherein said identifying a second storage unit to the memory management process comprises:
      determining if the second queue is empty; and if the second queue is empty, selecting the first storage unit as said second storage unit, to be identified as the memory management process as available for reuse in the main cache.

2. A method as recited in claim 1, wherein the first storage unit and the second storage unit are not the same storage unit.

3. A method as recited in claim 2, wherein the second storage unit is a storage unit currently stored in the victim cache.

4. A method as recited in claim 1, wherein the first storage unit and the second storage unit are the same storage unit.

5. A method as recited in claim 1, wherein network storage system maintains a plurality of storage units, including the first storage unit and the second storage unit, and wherein each of the plurality of storage units includes user data and metadata.

6. A method as recited in claim 5, wherein said destaging the first storage unit for storage in the victim cache is accomplished without copying the user data of the first storage unit.

7. A method as recited in claim 5, further comprising:
   after the metadata of a predetermined number of storage units have been stored in the first queue, storing the corresponding user data of said storage units from the main cache to the victim cache.

8. A method as recited in claim 7, wherein said identifying a second storage unit to the memory management process comprises:
   selecting the metadata of the second storage unit from a head of the second queue; and
   passing the metadata of the second storage unit to the memory management process.

9. A method of operating a processing system which includes a main cache and a victim cache, the method comprising:
   maintaining a first queue to store metadata identifying storage units that are to be stored in the victim cache;
   maintaining a second queue to store metadata identifying storage units that are stored in the victim cache;
   in conjunction with said storing the corresponding user data of said storage units from the main cache to the victim cache, storing the metadata of said storage units in the second queue;
   selecting a first storage unit for eviction from a main cache;
   in response to the first storage unit being selected for eviction from the main cache, wherein a storage unit in the main cache is to be overwritten in conjunction with selection of the first storage unit for eviction from the main cache;
   without blocking, destaging the first storage unit for storage in the victim cache, without copying the first storage unit, comprising storing metadata identifying the first storage unit in the first queue; and
   identifying a second storage unit from data at a head of the second queue and providing an indication that the second storage unit is available for reuse in the main cache,
   wherein said identifying a second storage unit comprises:
      determining if the second queue is empty; and if the second queue is empty, selecting the first storage unit as said second storage unit, to be identified as available for reuse in the main cache.

10. A method as recited in claim 9, further comprising:
after data identifying a predetermined number of storage units have been stored in the first queue:

storing the storage units from the main cache to the victim cache; and storing the data identifying said storage units in the second queue.

11. A method of operating a network storage server, the method comprising:

maintaining data in storage units of each of a non-volatile mass storage facility, a main cache and a victim cache of the network storage server, each of the storage units having user data and metadata associated therewith;

maintaining a first temporary storage structure to store metadata of storage units that are to be stored in the victim cache;

maintaining a second temporary storage structure to store metadata of storage units that are stored in the victim cache;

in conjunction with said storing the corresponding user data of said storage units from the main cache to the victim cache, storing the metadata of said storage units in the second temporary storage structure;

in response to a call by file system process of the storage server: selecting a first storage unit for eviction from the main cache, without blocking, storing metadata of the first storage unit, without copying the first storage unit, in the first temporary storage structure in response to the first storage unit being selected for eviction from the main cache, wherein a storage unit in the main cache is to be overwritten in conjunction with selection of the first storage unit for eviction from the main cache; and identifying a second storage unit as available to be overwritten in the main cache, wherein said identifying a second storage unit comprises:
 determining if the second queue is empty; and if the second temporary storage structure is empty, selecting the first storage unit as said second storage unit, to be identified as available for reuse in the main cache;
 if the second temporary storage structure is not empty, selecting a second storage unit from the second temporary storage structure, and identifying the second storage unit to the file system process, to indicate to the file system process that the second storage unit is available for reuse in the main cache.

12. A method as recited in claim 11, wherein the first temporary storage structure is a first queue and the second temporary storage structure is a second queue.

13. A method as recited in claim 12, wherein said selecting a second storage unit from the second temporary storage structure comprises:

selecting the second storage unit from a head of the second queue.

14. A method as recited in claim 12, further comprising:

after metadata of a predetermined number of storage units have been stored in the first queue:
 storing the user data of said storage units from the main cache to the victim cache; and
 storing the metadata of said storage units in the second queue.

15. A method as recited in claim 11, wherein:

the first temporary storage structure is a first queue and the second temporary storage structure is a second queue;

said selecting a second storage unit from the second temporary storage structure comprises selecting the second storage unit from a head of the second queue; and the method further comprises, after metadata of a predetermined number of storage units have been stored in the first queue:

storing the user data of said storage units from the main cache to the victim cache; and storing the metadata of said storage units in the second queue.

16. A storage server comprising:

a main cache;

a victim cache;

a storage manager to manage data stored in a non-volatile mass storage facility, the main cache and the victim cache, the storage manager including:

a scavenger module to scavenge storage units in the main cache in response to a call by a caller process, including to select a first storage unit for eviction from the main cache for storage in the victim cache, and a victim cache manager to respond to the first storage unit being selected for eviction from the main cache by, without blocking the caller process, destaging the first storage unit for storage in the victim cache without copying the first storage unit, wherein the caller process further is to overwrite a storage unit in the main cache in conjunction with selection of the first storage unit for eviction from the main cache; and, in conjunction with said destaging the first storage unit, to identify to the caller process a second storage unit as available for reuse in the main cache;

a first temporary storage structure to store metadata of storage units that are to be stored in the victim cache; and a second temporary storage structure to store metadata of storage units that are stored in the victim cache, wherein the victim cache manager is further configured to in conjunction with said storing the corresponding user data of said storage units from the main cache to the victim cache, storing the metadata of said storage units in the second temporary storage structure, wherein said destaging comprises storing the metadata of the first storage unit in the first temporary storage structure, and wherein said identifying a second storage unit to the caller process comprises:

determining if the second temporary storage structure is empty; and if the second temporary storage structure is empty, selecting the first storage unit as said second storage unit, to be identified the memory management process as available for reuse in the main cache.

17. A storage server as recited in claim 16, wherein the second storage unit is a storage unit currently stored in the victim cache.

18. A storage server as recited in claim 16, wherein the second storage unit is not a storage unit currently stored in the victim cache.

19. A storage server as recited in claim 16, wherein the storage server maintains a plurality of storage units, including the first storage unit and the second storage unit, wherein each of the plurality of storage units includes user data and metadata, and wherein said destaging the first storage unit for storage in the victim cache is accomplished without copying the user data of the first storage unit.

20. A storage server as recited in claim 16, wherein the victim cache manager further is to:

after information about a predetermined number of storage units have been stored in the first temporary storage structure, store corresponding user data of said storage units from the main cache to the victim cache.

21. A storage server as recited in claim 20, wherein the second temporary storage structure is a queue, and wherein the victim cache manager identifies to the caller process the second storage unit as available for reuse in the main cache by:

selecting the information about the second storage unit from a head of the second queue; and     passing the information about the second storage unit to the caller process.

22. A processing system comprising:

a main cache;

a victim cache;

means for performing data access operations on the main cache and the victim cache;

means for performing a first memory management process for selecting a first storage unit for eviction from the main cache, wherein the first memory management process further is for overwriting a storage unit in the main cache in conjunction with selection of the first storage unit for eviction from the main cache;

means for performing a second memory management process including, without blocking the first memory management process,     destaging the first storage unit for storage in the victim cache without copying the first storage unit,     identifying a second storage unit to the memory management process as available to be overwritten in the main cache;

a first temporary storage means for temporarily storing metadata of storage units that are to be stored in the victim cache; and a second temporary storage means for temporarily storing metadata of storage units that are stored in the victim cache, wherein the first memory management process is further configured to in conjunction with said storing the corresponding user data of said storage units from the main cache to the victim cache, storing the metadata of said storage units in the second temporary storage means, wherein said destaging comprises storing the metadata of the first storage unit in the first temporary storage means, and wherein said identifying a second storage unit to the memory management process comprises:

determining if the second temporary storage means is empty; and if the second temporary storage means is empty, selecting the first storage unit as said second storage unit, to be identified the memory management process as available for reuse in the main cache.

\* \* \* \* \*